United States Patent
Kulkarni et al.

(10) Patent No.: US 11,509,743 B2
(45) Date of Patent: *Nov. 22, 2022

(54) PROVISIONING MULTI-TENANT, MICROSERVICE ARCHITECTURE-BASED INTEGRATION SERVICE IN A CLOUD COMPUTING ENVIRONMENT

(71) Applicant: SAP SE, Walldorf (DE)

(72) Inventors: Gopalkrishna Kulkarni, Bangalore (IN); Sapreen Ahuja, Bangalore (IN); Bhagyesh Hede, Bangalore (IN); Sripad J, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/379,045

(22) Filed: Jul. 19, 2021

(65) Prior Publication Data

US 2021/0344775 A1    Nov. 4, 2021

Related U.S. Application Data

(63) Continuation of application No. 16/526,246, filed on Jul. 30, 2019, now Pat. No. 11,102,328.

(30) Foreign Application Priority Data

May 9, 2019   (IN) .......................... IN201911018529

(51) Int. Cl.
*G06F 15/173*   (2006.01)
*H04L 67/61*   (2022.01)
*G06F 9/50*   (2006.01)
*H04L 67/025*   (2022.01)
*H04L 67/133*   (2022.01)
*H04L 67/567*   (2022.01)

(52) U.S. Cl.
CPC ............ *H04L 67/61* (2022.05); *G06F 9/5038* (2013.01); *H04L 67/025* (2013.01); *H04L 67/133* (2022.05); *H04L 67/567* (2022.05)

(58) Field of Classification Search
CPC . H04L 67/322; H04L 67/025; H04L 67/2838; H04L 67/40; H04L 67/10; G06F 9/5038; G06F 2209/504; G06F 9/5072; Y02D 10/00
USPC ......... 709/226, 223; 707/636, 705, 821, 609
See application file for complete search history.

(56) References Cited

U.S. PATENT DOCUMENTS

| 2014/0136712 A1* | 5/2014 | Kim ....................... H04L 47/70 709/226 |
| 2014/0189682 A1* | 7/2014 | Crudele ................ G06F 3/0665 718/1 |
| 2018/0176176 A1* | 6/2018 | Kapur ................. H04L 61/1511 |

(Continued)

*Primary Examiner* — Thuong Nguyen
(74) *Attorney, Agent, or Firm* — Buckley, Maschoff & Talwalkar LLC

(57) ABSTRACT

According to some embodiments, methods and systems may include a data storage device that contains user identifiers and associated entitlement values for a plurality of tenants of a cloud computing environment. A provisioning application platform processor may receive a user request for an integration service and access the data storage device. The provisioning application platform processor may then transmit at least one entitlement value to a platform resource manager processor to facilitate creation of a plurality of microservices resulting in implementation of the integration service for the user.

18 Claims, 10 Drawing Sheets

(56) References Cited

U.S. PATENT DOCUMENTS

2020/0120098 A1* 4/2020 Berg ..................... H04L 63/104
2020/0358876 A1* 11/2020 Kulkarni ............. H04L 67/2838
2021/0409267 A1* 12/2021 Ozkan ................. H04L 41/5054

* cited by examiner

PROVISIONING MULTI-TENANT, MICROSERVICE ARCHITECTURE-BASED INTEGRATION SERVICE IN A CLOUD COMPUTING ENVIRONMENT

CROSS-REFERENCE TO RELATED APPLICATIONS

The present application is a continuation of U.S. patent application Ser. No. 16/526,246 entitled "PROVISIONING MULTI-TENANT, MICROSERVICE ARCHITECTURE-BASED INTEGRATION SERVICE IN A CLOUD COMPUTING ENVIRONMENT" and filed Jul. 30, 2019. The entire content of that application is incorporated herein by reference.

BACKGROUND

An enterprise may utilize a cloud computing environment to let users perform tasks. For example, the enterprise might let various users execute an application via the cloud computing environment to process purchase orders, adjust human resources information, generate invoices, etc. In some cases, the cloud computing environment will support multiple tenants and create applications using multiple microservices (e.g., one microservice might be associated with a user interface while another microservice handles database resources). Moreover, different users may be entitled to different levels of service or performance. For example, the user of a "free" account may have limited storage as compared to a user of a "paid" account. Provisioning microservices appropriately in such cases, however, can be a difficult task. It would therefore be desirable to provide for the provision of a multi-tenant, microservice architecture-based integration service in a cloud computing environment in a secure, automatic, and efficient manner.

SUMMARY

According to some embodiments, methods and systems may include a data storage device that contains a data storage device that contains user identifiers and associated entitlement values for a plurality of tenants of a cloud computing environment. A provisioning application platform processor may receive a user request for an integration service and access the data storage device. The provisioning application platform processor may then transmit at least one entitlement value to a platform resource manager processor to facilitate creation of a plurality of microservices resulting in implementation of the integration service for the user.

Some embodiments comprise: means for receiving, at a provisioning application platform processor, a user request for an integration service; means for accessing, by the provisioning application platform processor, a data storage device containing user identifiers and associated entitlement values for a plurality of tenants of the cloud computing environment; and means for transmitting at least one entitlement value to a platform resource manager processor to facilitate creation of a plurality of microservices resulting in implementation of the integration service for the user.

Some technical advantages of some embodiments disclosed herein are improved systems and methods to provide for the provision of a multi-tenant, microservice architecture-based integration service in a cloud computing environment in a secure, automatic, and efficient manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Note that Integration as a Service ("IaaS") software is a different offering as compared to a normal application executing in a cloud computing environment. For example, a normal application typically has set of registered users for whom access can be allowed after a successful registration. In a cloud or multi-cloud platform (e.g., such as Cloud Foundry), normal applications can directly be allowed to be provisioned using simple application design and user management. The user who provisions the application can directly and easily use the application. However, an integration service in a cloud platform may have a microservice architecture that offers multiple applications (or a set of applications). For example, an integration design User Interface ("UI") may represent one application, while a monitoring UI is another application and a runtime working node is another service. Together, these services may constitute integration service software.

In a multi-cloud landscape, stand-alone, individual applications may be provisioned as a tenant. For multiple applications, multiple provisions must be done which results in complex user interfaces and maintenance overhead for a software developer. For example, a tenant may have different capabilities (e.g., standard, advanced, or free accounts). For a provisioning to cater to a tenant with appropriate capabilities for each user, several interactions with cloud platform ordering systems may be required. This may result in duplicate coding for each provisioning application.

Figure 1A:
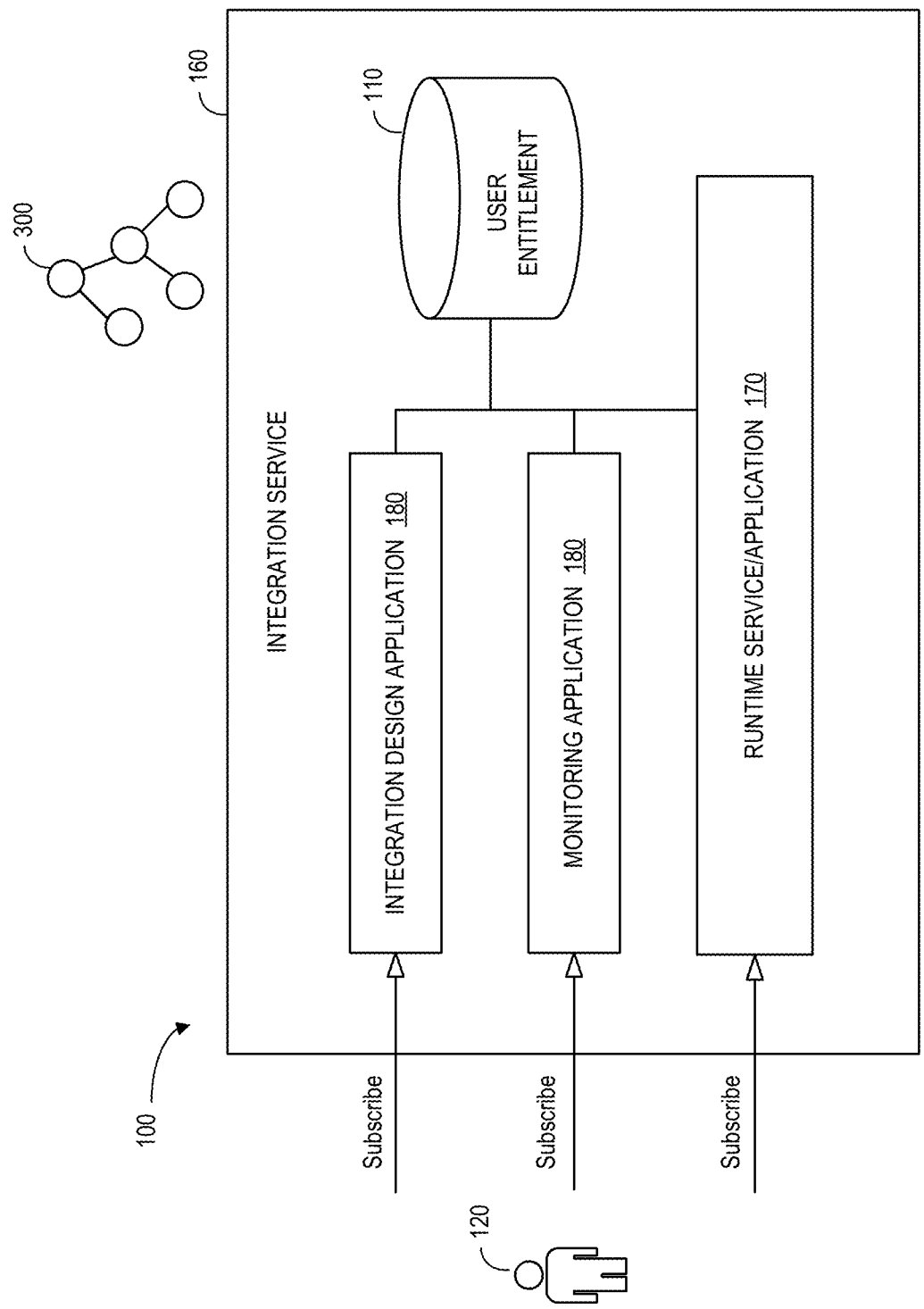
FIG. 1A is a high-level block diagram of a system.

FIG. 1A is a high-level block diagram of a system 100 that provides an integration service 300. In particular, an integration service platform 160 stores user entitlements 110. A user 120 may then subscribe to various microservices 180 and a runtime service/application 170 may create the integration service 300 using the microservices 180. In existing systems, the user 120 must perform multiple subscriptions to get a single integration service tenant. Further, each application must keep checking the user entitlements 110 before performing the subscription.

Figure 1B:
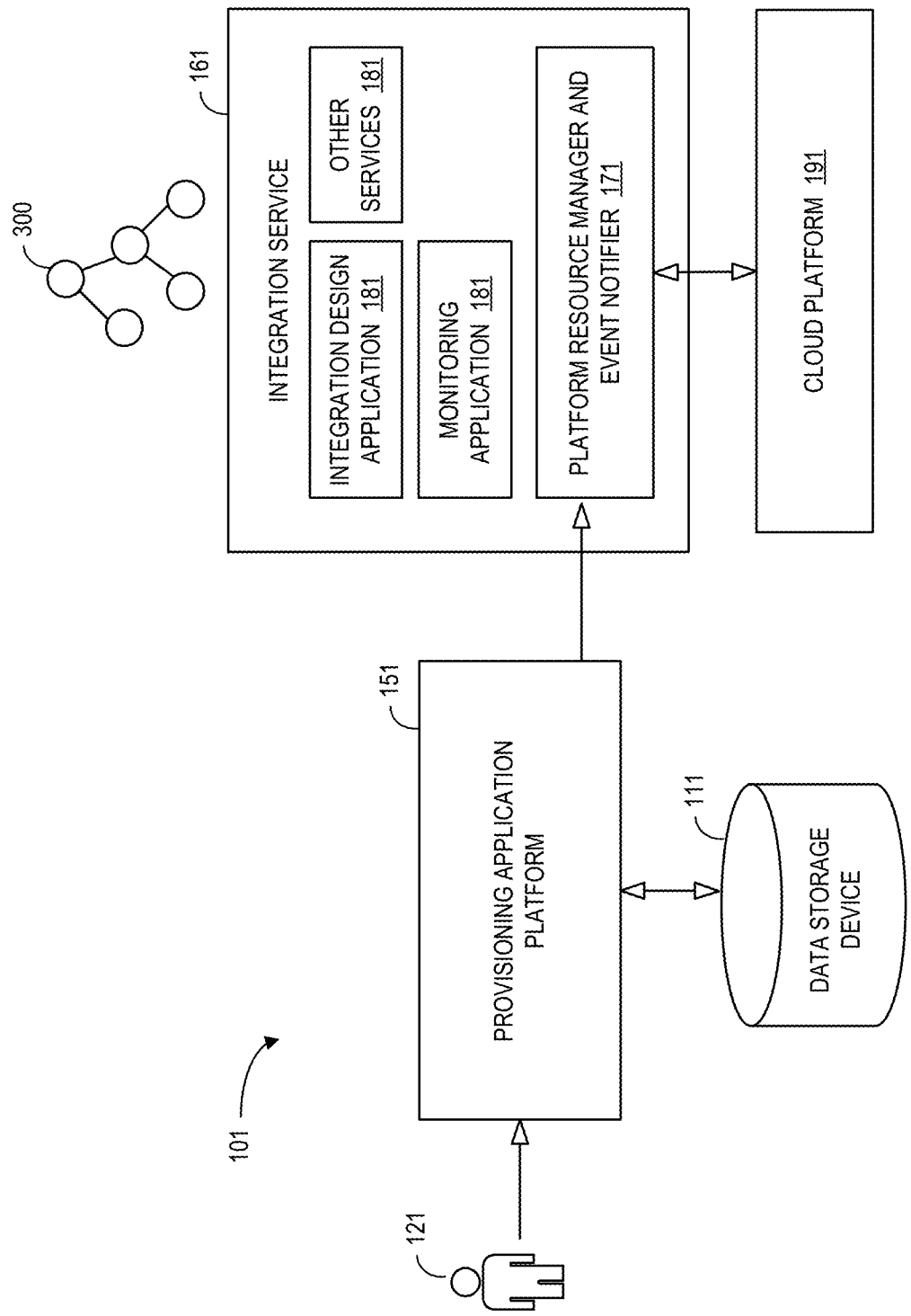
FIG. 1B is a high-level block diagram of a system in accordance with some embodiments.

To avoid such a result, FIG. 1B is a high-level block diagram of a system 101 in accordance with some embodiments. The system 101 includes a provisioning application platform 151 that accesses user entitlement information in a data storage device 111. The provisioning application platform 151 might use this information, for example, to create an integration service 300 for a user 121. The provisioning application platform 151 may communicate with an integration service platform 161 configured with a platform resource manager and event notifier 171 that interacts with a cloud platform 191 and creates the integration service 300 from microservices 181. The process might be performed automatically or be initiated via a command from a remote operator interface device. As used herein, the term "automatically" may refer to, for example, actions that can be performed with little or no human intervention.

As used herein, devices, including those associated with the system 101 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The provisioning application platform 151 may store information into and/or retrieve information from various data stores (e.g., the data storage device 111), which may be locally stored or reside remote from the provisioning application platform 151. Although a single provisioning application platform 151 is shown in FIG. 1B, any number of such devices may be included. Moreover, various devices described herein might be combined according to embodiments of the present invention. For example, in some embodiments, the data storage device 111 and the provisioning application platform 151 might comprise a single apparatus. The system 101 functions may be performed by a constellation of networked apparatuses, such as in a distributed processing or cloud-based architecture.

A user may access the system 101 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to define how microservices 181 interact) and/or provide or receive automatically generated recommendations or results from the system 101.

Figure 2:
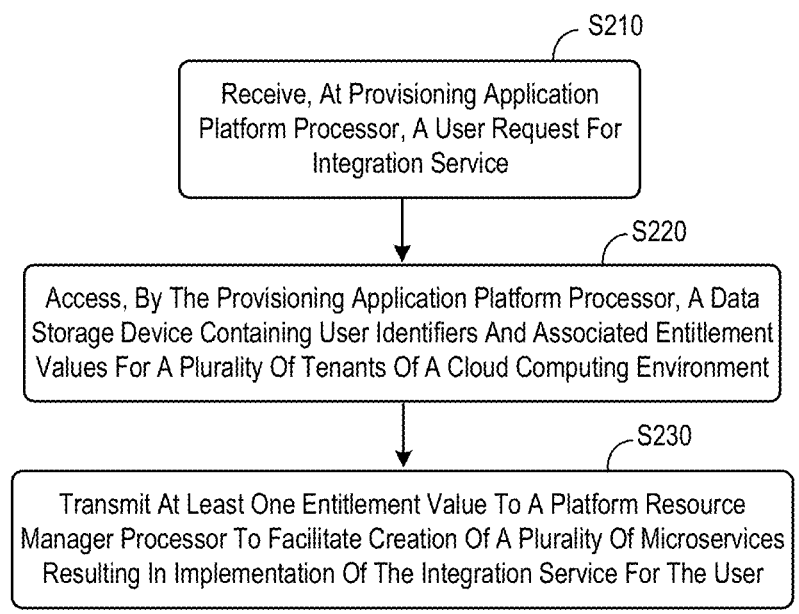
FIG. 2 is a method according to some embodiments.

FIG. 2 is a method that might performed by some or all of the elements of the system 101 described with respect to FIG. 1B. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a provisioning application platform processor may receive a user request for an integration service. According to some embodiments, the provisioning application platform processor is associated with a Software-as-a-Service ("SaaS") and/or a Platform-as-a-Service ("PaaS"). Moreover, the request from the user may be associated with a subscribe request. Note that the provisioning application platform processor may also verify that tenant-onboarding is completed successfully and/or support a decommissioning process (e.g., as described with respect to FIG. 6).

At S220, the provisioning application platform processor may access a data storage device containing user identifiers and associated entitlement values for a plurality of tenants of the cloud computing environment. The provisioning application platform processor may store entitlement information is stored in a scope of the provisioning application platform processor and/or a commercialization component of a cloud computing environment platform.

Figure 3:
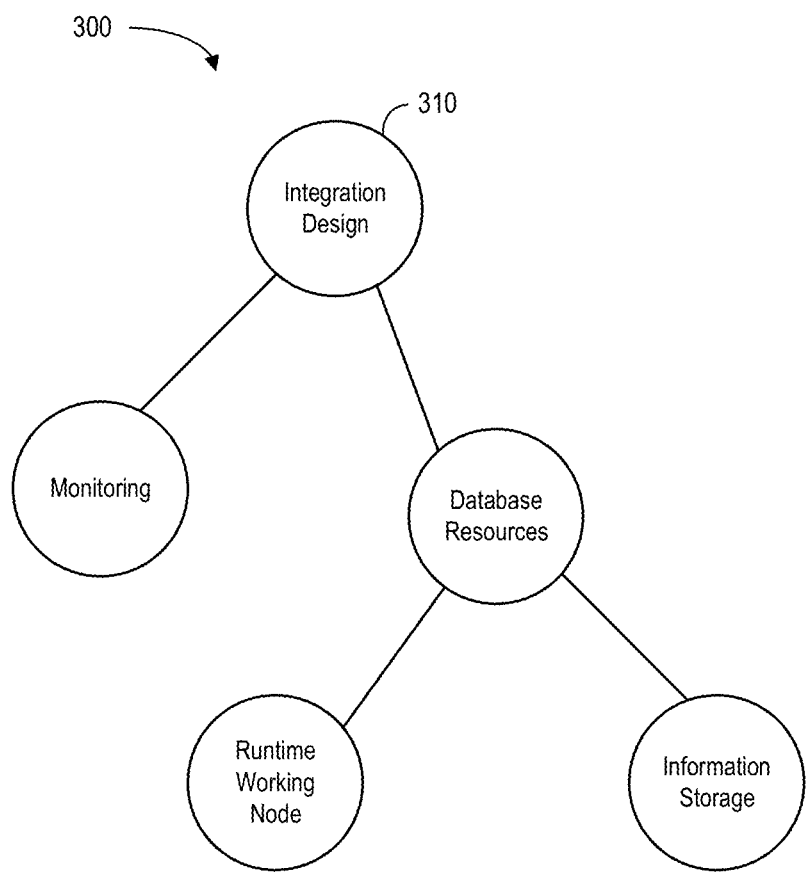
FIG. 3 is an example of an integration service in accordance with some embodiments.

At S230, the system may transmit at least one entitlement value to a platform resource manager processor to facilitate creation of a plurality of microservices resulting in implementation of the integration service for the user. For example, FIG. 3 is an example of an integration service 300 associated with multiple microservice components 310 in accordance with some embodiments. Each microservice component 310 might be associated with, for example, an integration design UI application, a monitoring UI application, a runtime working node, an information storage service, database resources, etc. According to some embodiments, the platform resource manager processor may create tenant specific resources, create tenant specific instances, and/or bind applications to the resources and instances. Note that the platform resource manager may be associated with an inbuild event publish/subscribe framework.

Figure 4:
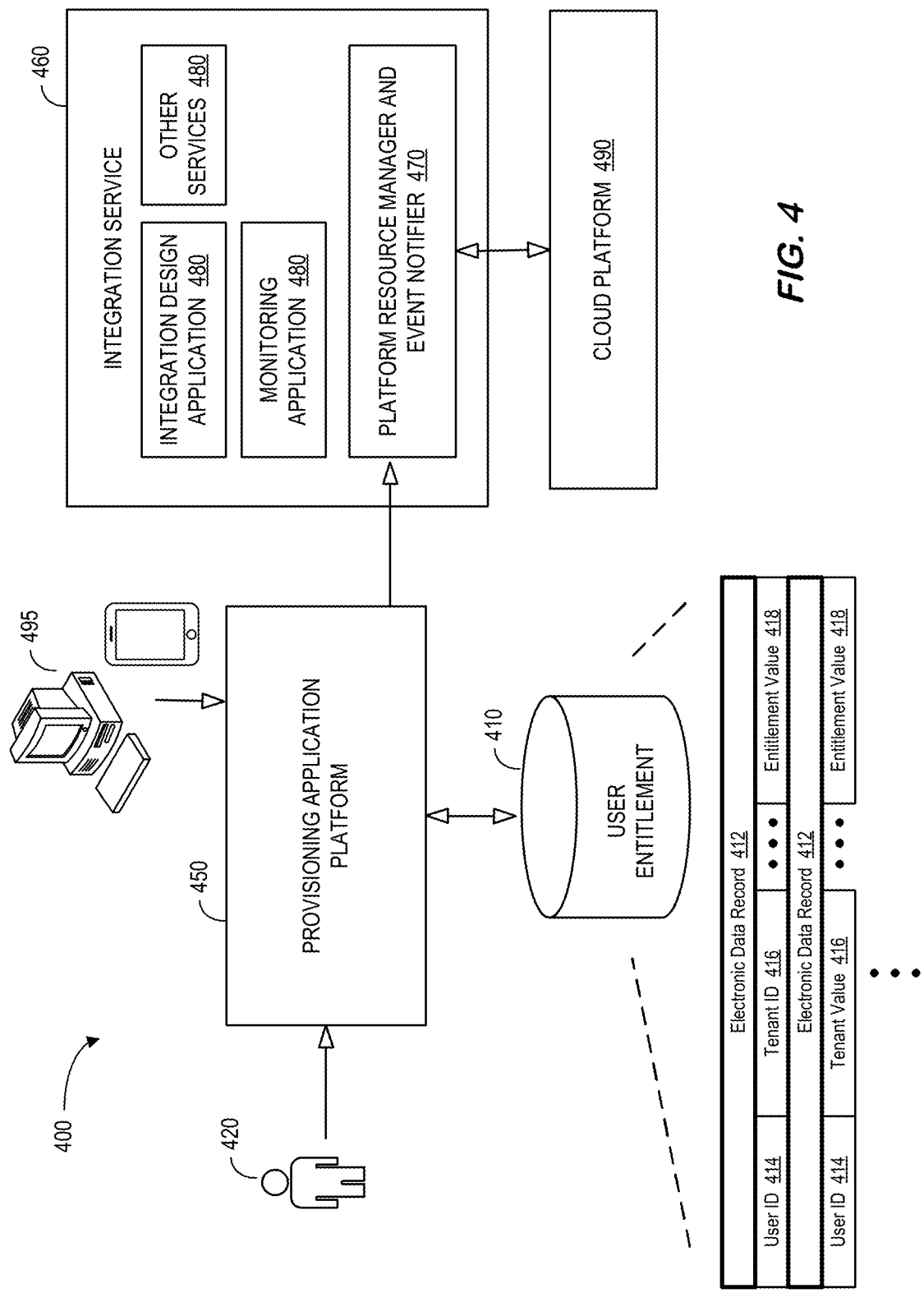
FIG. 4 is a more detailed high-level block diagram of a provisioning system in accordance with some embodiments.

FIG. 4 is a more detailed high-level block diagram of a provisioning system 400 in accordance with some embodiments. As before, the system 400 includes a provisioning application platform 450 that accesses user entitlement information 410 in a data storage device. The user entitlement information 410 may include electronic data records 412 that contain a user identifier 414, a tenant identifier, 416, entitlement values 418, etc. The provisioning application platform 450 might use this information, for example, to create an integration service 300 for a user 420. The provisioning application platform 450 may communicate with an integration service platform 460 configured with a platform resource manager and event notifier 470 that interacts with a cloud platform 490 and creates the integration service 300 from microservices 480.

Thus, embodiments described herein may offer a centrally managed application for provisioning. Moreover, a provisioning application may represent a single point entry (for end users) to get an integration service tenant. The provisioning application may coordinate with microservices of the integration service and render an appropriate integration design application after the provisioning process is completed.

Note that the tenant on-boarding in a cloud computing environment may create tenant specific resources/instances and bind the applications to them. This job may be delegated to a generic component such as a platform resource manager. The platform resource manager may have an inbuilt event publish/subscribe frame work. In a microservice architecture, there may be several microservices involved in the creation of integration service software. Moreover, some microservices may need to be notified about a new request (subscribe request) for provisioning so that they can initialize data as appropriate. The provisioning application may also be responsible for making sure the tenant-onboarding (also referred to herein as "provisioning") is completed successfully. For these, embodiments may use a case event publish/subscribe model. Each microservice may respond to generated events which will act as proof of confirmation that all participant microservices have succeeded in the tenant-onboarding process.

The provisioning application may maintain the user entitlement information (note that the provisioning application might keep this information stored to its scope or can get this information from a commercialization component of the cloud platform). Based on the entitlement capabilities, the user might be offered an intermediate UI to configure and ask for a tenant. Based on the available capabilities, the provisioning application may execute the tenant-onboarding (e.g., database resources may be created with a relatively small size for a free account as compared to a paid production account).

According to some embodiments, the provisioning application may provide a single source of truth for global account level tenant statistics. The provisioning application may also initiate provisioning/termination and later confirmation to a tenant administrator via an intermediate UI. Status monitoring for the tenant administrator (e.g., provisioning success/failed/retry) may be provided for tenant administrator along with access management for the provisioning. Some embodiments may provide an ability to host an endpoint to receive resource manager communication (e.g., the resource manager may send a notification of on-boarding/termination task status in a call-back fashion). The provisioning application may also provide audit logging of provisioning/termination, handle both automatic termination (e.g., upon an expiration event) and self-service un-subscribe requests, and execute quota management.

The resource manager may implement platform agnostic Application Program Interfaces ("APIs") for tenant on-boarding in the space specific to the resource manager. The resource manager may provide a single source of truth for all the tenants on-boarded/terminated for that space and track the status (failure handling/retry) of the tenant on-boarding/termination. Microservices notification of the on-boarding/termination may also be provided along with concurrency/scaling handling. Since the resource manager may cater to other use cases, it should make sure it scales if provisioning requests increase for a given period without blocking users. The resource manager may maintain a state machine to support one tenant on-boarding/termination request per unique identifier.

Figure 5:
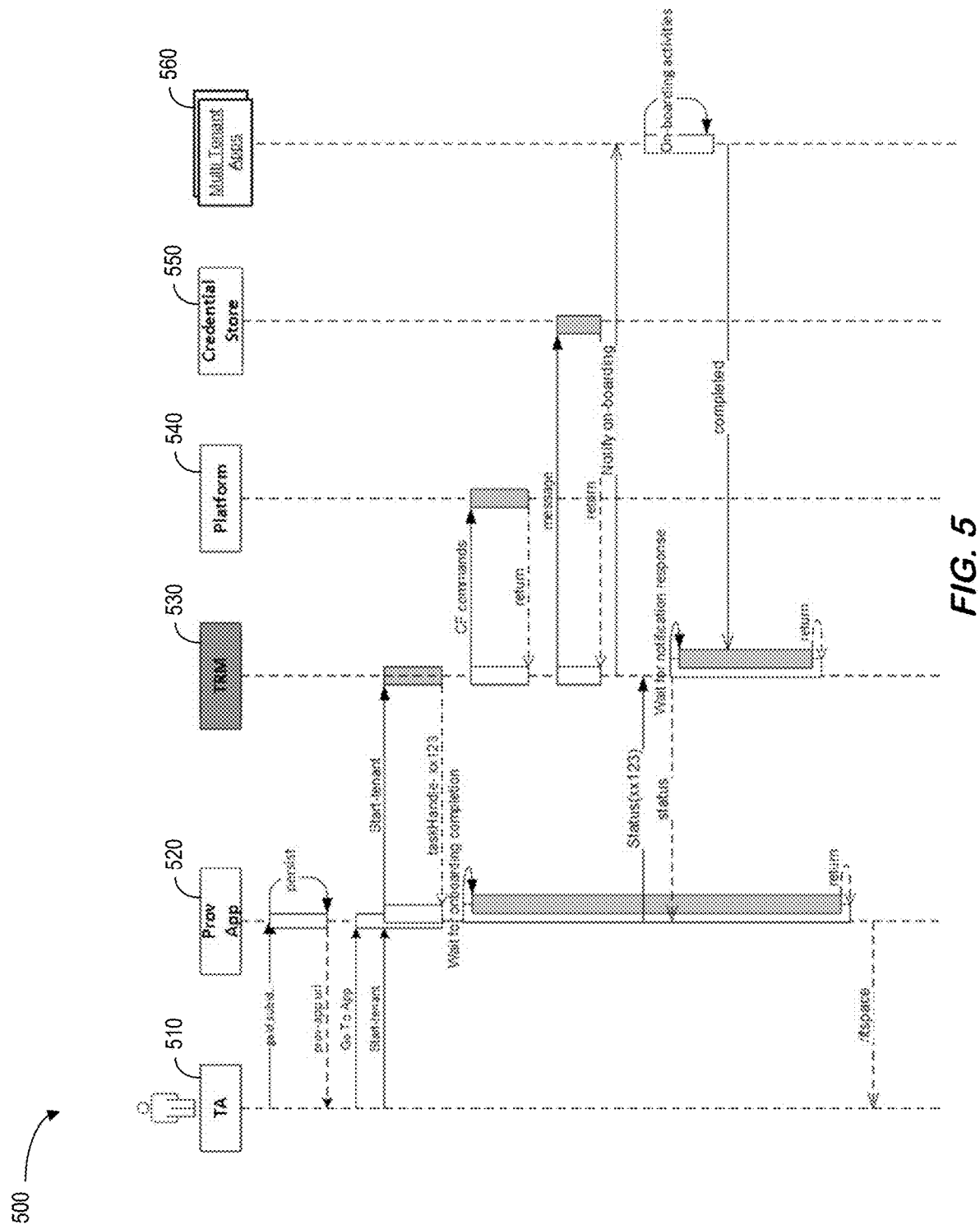
FIG. 5 is an information flow diagram of a provisioning process according to some embodiments.

FIG. 5 is an information flow diagram of a provisioning process 500 according to some embodiments. The process 500 includes a Tennant Account ("TA") 510, a provisioning application 520, a Tenant Resource Manager ("TRM") 530, a platform 540, a credential store 550, and multi-tenant applications 560. Note that the call-back frame work may utilize synchronization handling of the subscribe if a subscription more than a pre-determined period of time. According to some embodiments, tenant on-boarding may take a relatively long amount of time and hence an intermediate UI may be required. The provisioning application 520 call back will first persist the request (after checking for any duplicate attempts) and return a response. Upon a successful subscription, a go-to application will offer a provisioning application UI where the customer has to click a "Start Tenant" icon to request a tenant. In simple terms, the on-boarding may be a two-step self-service process. According to some embodiments, the provisioning application 520 is a single source of truth for global account level tenant statistics which can be used for various use case, such as quota management, metering, etc. Hence, the provisioning application 520 may maintain the global account level on-boarding information of the tenants. On user action of provision, the TRM API will be called. The TRM 530 will provide a task handle and the status may be be polled. Upon successful completion, the tenant may be offered to the user.

Figure 6:
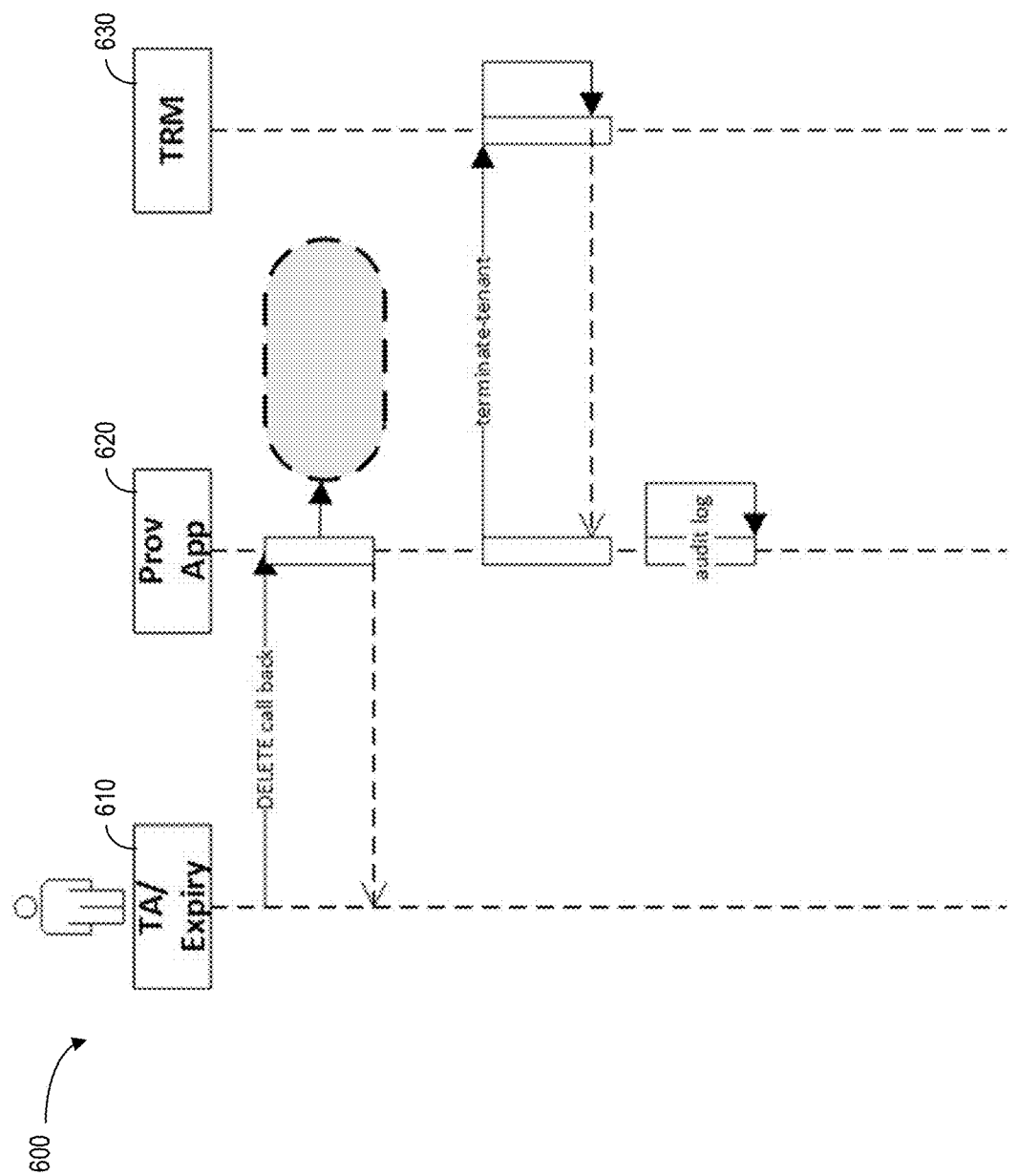
FIG. 6 is an information flow diagram of a decommissioning process in accordance with some embodiments.

FIG. 6 is an information flow diagram of a decommissioning process 600 in accordance with some embodiments. The process 600 includes a TA 610, a provisioning application 620, and a TRM 630. As used herein, the terms termination/deletion/unsubscribe are used interchangeably. A termination might happen, for example, via: (i) a self-service unsubscribe, (ii) a self-service account deletion, or (iii) an auto termination (e.g., after 90 days). In all three cases, the system may get a same subscribe call back with a DELETE method. The subscribe call back might have, for example, a timeout of 30 to 60 seconds. According to some embodiments, the system may perform the deletion asynchronously. The unsubscribe call back implementation at the provisioning application 620 may perform the following:

Bring the consistent state (i.e., honour the latest request—such as deletion or subscription—during multiple attempts. For example, a termination call may come during the provisioning. This call may be queued and after the provisioning task is complete, the termination call may be fired.

Run an automatic clean up job. For example, it might be the case that the provisioning application 620 is down during a call back. The system will not attempt the call backs again. Hence, the system may check the stale tenants using the API and delete them as appropriate.

Figure 7:
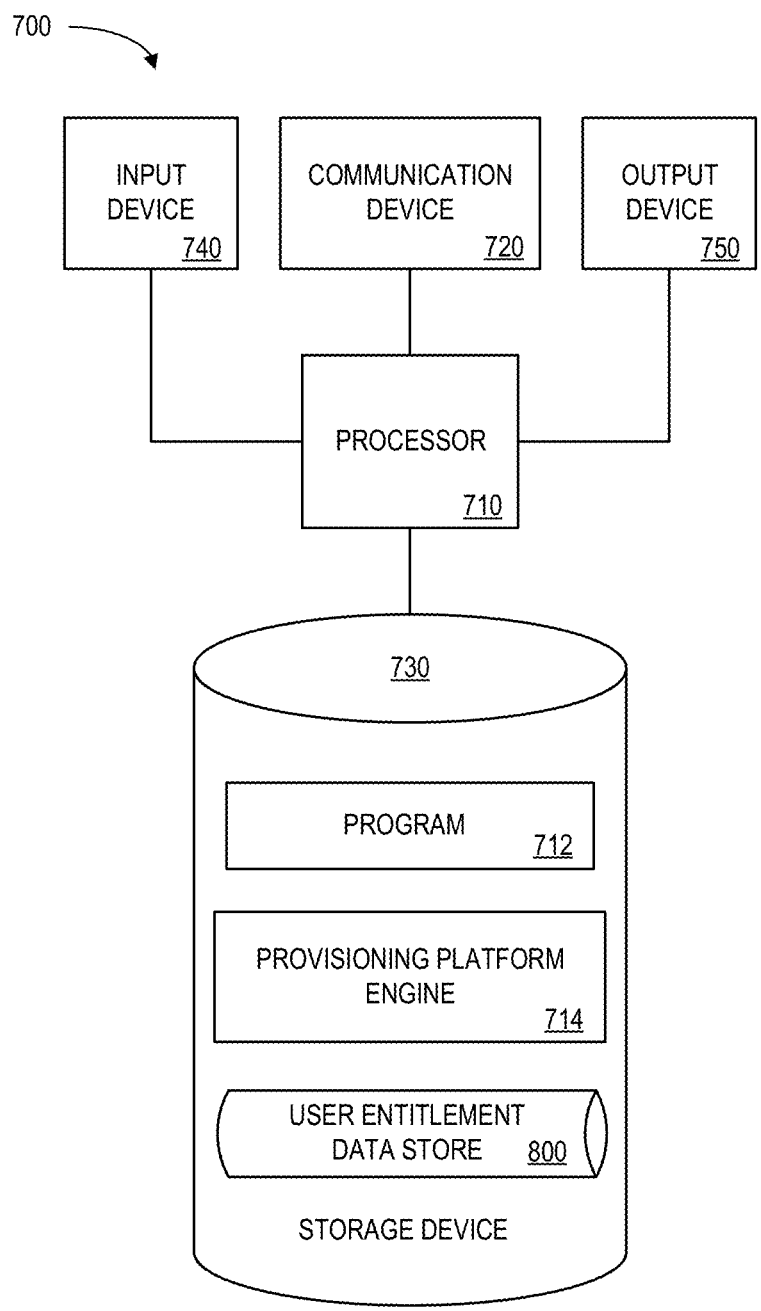
FIG. 7 is an apparatus or platform according to some embodiments.

Note that the embodiments described herein may also be implemented using any number of different hardware configurations. For example, FIG. 7 is a block diagram of an apparatus or platform 700 that may be, for example, associated with the systems 101, 400 of FIGS. 1B and 4, respectively (and/or any other system described herein). The platform 700 comprises a processor 710, such as one or more commercially available Central Processing Units ("CPUs") in the form of one-chip microprocessors, coupled to a communication device 760 configured to communicate via a communication network (not shown in FIG. 7). The communication device 760 may be used to communicate, for example, with one or more remote user platforms, administrator platforms, etc. The platform 700 further includes an input device 740 (e.g., a computer mouse and/or keyboard to input microservice information) and/an output device 750 (e.g., a computer monitor to render a display, transmit recommendations, and/or create reports about integration services, tenants, users, etc.). According to some embodiments, a mobile device, monitoring physical system, and/or PC may be used to exchange information with the platform 700.

The processor 710 also communicates with a storage device 730. The storage device 730 may comprise any appropriate information storage device, including combinations of magnetic storage devices (e.g., a hard disk drive), optical storage devices, mobile telephones, and/or semiconductor memory devices. The storage device 730 stores a program 712 and/or provisioning platform engine 714 for controlling the processor 710. The processor 710 performs instructions of the programs 712, 714, and thereby operates in accordance with any of the embodiments described herein. For example, the processor 710 may access a data storage device that contains user identifiers and associated entitlement values for a plurality of tenants of a cloud computing environment. The processor 710 may receive a user request for an integration service and access the data storage device. The processor 710 may then transmit at least one entitlement value to a platform resource manager processor to facilitate creation of a plurality of microservices resulting in implementation of the integration service for the user.

The programs 712, 714 may be stored in a compressed, uncompiled and/or encrypted format. The programs 712, 714 may furthermore include other program elements, such as an operating system, clipboard application, a database management system, and/or device drivers used by the processor 710 to interface with peripheral devices.

As used herein, information may be "received" by or "transmitted" to, for example: (i) the platform 700 from another device; or (ii) a software application or module within the platform 700 from another software application, module, or any other source.

In some embodiments (such as the one shown in FIG. 7), the storage device 730 further stores a user entitlement data store 800. An example of a database that may be used in connection with the platform 700 will now be described in detail with respect to FIG. 8. Note that the database described herein is only one example, and additional and/or different information may be stored therein. Moreover, various databases might be split or combined in accordance with any of the embodiments described herein.

Figure 8:
FIG. 8 is portion of a user entitlement data store in accordance with some embodiments

Referring to FIG. 8, a table is shown that represents the user entitlement data store 800 that may be stored at the platform 700 according to some embodiments. The table may include, for example, entries identifying users who may request integrations services associated with a cloud computing environment. The table may also define fields 802, 804, 806, 808, 810 for each of the entries. The fields 802, 804, 806, 808, 810 may, according to some embodiments, specify: a user identifier 802, a tenant identifier 804, an integration service identifier 806, microservices 808, and entitlements 810. The user entitlement data store 800 may be created and updated, for example, when new users or tenants are added to a system, entitlement rules change, etc.

The user identifier 802 might be a unique alphanumeric label that is associated with a user who may request an integration service associated with a cloud computing environment. The tenant identifier 804 may represent an enterprise, group of users, etc. who utilize the cloud computing environment. The integration service identifier 806 may define an application (e.g., a payroll or human resources application) composed of a number of different microservices 808. The entitlements 810 may define rules, business logic, conditions, etc. that indicate a level of service or resources that may be available to a particular user (e.g., based on whether the user has a free, limited account or a paid, enhanced account).

Figure 9:
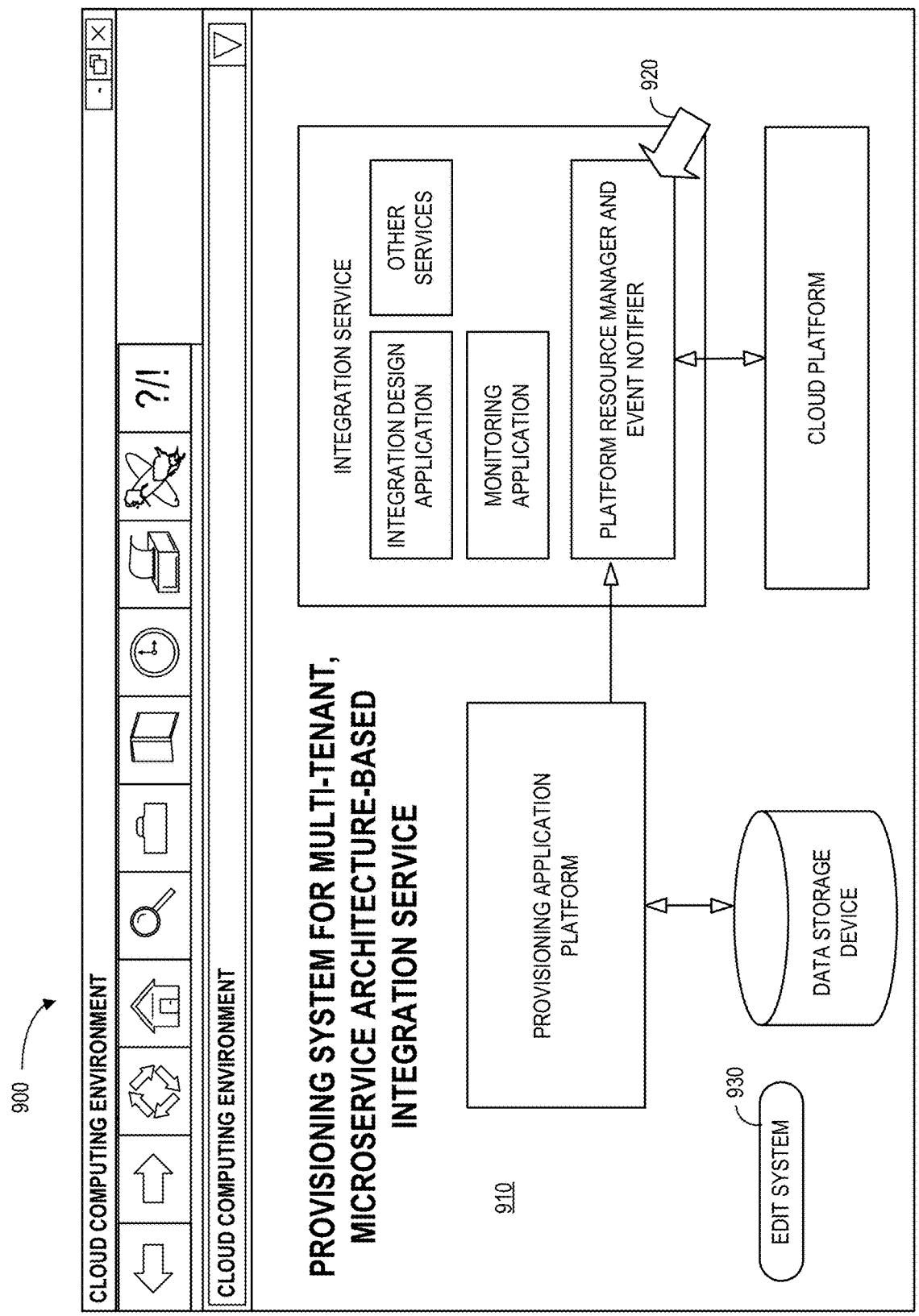
FIG. 9 is a human machine interface display according to some embodiments.

FIG. 9 is a human machine interface display 900 in accordance with some embodiments. The display 900 includes a graphical representation 910 of a provisioning system in accordance with any of the embodiments described herein. Selection of an element on the display 900 (e.g., via a touch-screen or computer pointer 920) may result in display of a pop-up window containing more detailed information about that element and/or various options (e.g., to add a microservice, modify entitlements, etc.). Selection of an "Edit System" icon 930 may also let an operator or administrator adjust the operation of the provisioning system.

Thus, embodiments may provide for the provision of a multi-tenant, microservice architecture-based integration service in a cloud computing environment in a secure, automatic, and efficient manner.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of integration services and microservices, any of the embodiments described herein could be applied to other types of applications. Moreover, the displays shown herein are provided only as examples, and any other type of user interface could be implemented.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system associated with a cloud computing environment, comprising:
   a data storage device containing user identifiers and associated entitlement values for a plurality of tenants of the cloud computing environment, wherein the entitlement values are associated with tenant payments;
   a platform resource manager, at an integration service, having access to the cloud computing environment; and
   a provisioning application platform, between a user device and the platform resource manager and coupled to the data storage device, to: (i) receive from the user device a user subscribe request for an integration design application associated with an inbuild event publish/subscribe framework, (ii) access the data storage device, and (iii) transmit at least one entitlement value to the platform resource manager to facilitate creation of a plurality of microservices, by the integration service, resulting in implementation of the integration design application for the user,
   wherein the platform resource manager is to: (i) create tenant specific resources based on the at least one entitlement value via the inbuild event publish/subscribe framework, wherein the at least one entitlement value is associated with an account storage limit or a Service Level Agreement ("SLA"), (ii) create tenant specific instances, and (iii) bind applications to the resources and instances to create the integration design application.

2. The system of claim 1, wherein at least one microservice is associated with at least one of: (i) an integration design user interface application, (ii) a monitoring user interface application, (iii) a runtime working node, (iv) an information storage service, and (v) database resources.

3. The system of claim 1, wherein the provisioning application platform is associated with at least one of: (i) a Software-as-a-Service, and (ii) a Platform-as-a-Service.

4. The system of claim 1, wherein the provisioning application platform is further to verify that tenant-onboarding is completed successfully.

5. The system of claim 1, wherein the provisioning application platform accesses entitlement information stored in at least one of: (i) a scope of the provisioning application platform, and (ii) a commercialization component of a cloud computing environment platform.

6. The system of claim 1, wherein the provisioning application platform further supports a decommissioning process.

7. A non-transitory, computer-readable medium having executable instructions stored therein, the medium comprising:
   instructions to receive, at a provisioning application platform from a user device, a user subscribe request for an integration design application associated with an inbuild event publish/subscribe framework, wherein the provisioning application platform is between the user device and a platform resource manager of an integration service;
   instructions to access, by the provisioning application platform, a data storage device, coupled to the provisioning application platform, containing user identifiers and associated entitlement values for a plurality of tenants of the cloud computing environment, wherein the entitlement values are associated with tenant payments; and
   instructions to transmit at least one entitlement value to the platform resource manager to facilitate creation of a plurality of microservices resulting in implementation of the integration design application for the user,
   wherein the platform resource manager is to: (i) create tenant specific resources based on the at least one entitlement value via the inbuild event publish/subscribe framework, wherein the at least one entitlement value is associated with an account storage limit or a Service Level Agreement ("SLA"), (ii) create tenant specific instances, and (iii) bind applications to the resources and instances to create the integration design application.

8. The non-transitory, computer-readable medium of claim 7, wherein at least one microservice is associated with at least one of: (i) an integration design user interface application, (ii) a monitoring user interface application, (iii) a runtime working node, (iv) an information storage service, and (v) database resources.

9. The non-transitory, computer-readable medium of claim 7, wherein the provisioning application platform is associated with at least one of: (i) a Software-as-a-Service, and (ii) a Platform-as-a-Service.

10. The non-transitory, computer-readable medium of claim 7, wherein the provisioning application platform is further to verify that tenant-onboarding is completed successfully.

11. The non-transitory, computer-readable medium of claim 7, wherein the provisioning application platform accesses entitlement information stored in at least one of: (i) a scope of the provisioning application platform, and (ii) a commercialization component of a cloud computing environment platform.

12. The non-transitory, computer-readable medium of claim 7, wherein the provisioning application platform further supports a decommissioning process.

13. A computer-implemented method associated with a cloud computing environment, comprising:
   receiving, at a provisioning application platform from a user device, a user subscribe request for an integration design application associated with an inbuild event publish/subscribe framework, wherein the provisioning application platform is between the user device and a platform resource manager of an integration service;
   accessing, by the provisioning application platform, a data storage device, coupled to the provisioning application platform, containing user identifiers and associated entitlement values for a plurality of tenants of the cloud computing environment, wherein the entitlement values are associated with tenant payments; and
   transmitting at least one entitlement value to a platform resource manager to facilitate creation of a plurality of microservices resulting in implementation of the integration design application for the user,
   wherein the platform resource manager is to: (i) create tenant specific resources based on the at least one entitlement value via the inbuild event publish/subscribe framework, wherein the at least one entitlement value is associated with an account storage limit or a Service Level Agreement ("SLA"), (ii) create tenant specific instances, and (iii) bind applications to the resources and instances to create the integration design application.

14. The method of claim 13, wherein at least one microservice is associated with at least one of: (i) an integration design user interface application, (ii) a monitoring user interface application, (iii) a runtime working node, (iv) an information storage service, and (v) database resources.

15. The method of claim 13, wherein the provisioning application platform is associated with at least one of: (i) a Software-as-a-Service, and (ii) a Platform-as-a-Service.

16. The method of claim 13, wherein the provisioning application platform is further to verify that tenant-onboarding is completed successfully.

17. The method of claim 13, wherein the provisioning application platform accesses entitlement information stored in at least one of: (i) a scope of the provisioning application platform, and (ii) a commercialization component of a cloud computing environment platform.

18. The method of claim 13, wherein the provisioning application platform further supports a decommissioning process.

* * * * *